(12) United States Patent
Caregnato et al.

(10) Patent No.: US 12,467,621 B2
(45) Date of Patent: Nov. 11, 2025

(54) BIOMASS BURNER AND CORRESPONDING BIOMASS COMBUSTION METHOD

(71) Applicant: BLUCOMB S.R.L., Chions (IT)

(72) Inventors: Davide Caregnato, Mareno di Piave (IT); Daniele Della Toffola, Buttrio (IT); Carlo Ferrato Di Sbrojavacca, Chions (IT); Alessandro Peressotti, Udine (IT)

(73) Assignee: BLUCOMB S.R.L., Chions (IT)

( * ) Notice: Subject to any disclaimer, the term of this patent is extended or adjusted under 35 U.S.C. 154(b) by 892 days.

(21) Appl. No.: 17/924,798

(22) PCT Filed: Oct. 1, 2020

(86) PCT No.: PCT/IT2020/050242
§ 371 (c)(1),
(2) Date: Nov. 11, 2022

(87) PCT Pub. No.: WO2021/064762
PCT Pub. Date: Apr. 8, 2021

(65) Prior Publication Data
US 2023/0258329 A1    Aug. 17, 2023

(30) Foreign Application Priority Data

Oct. 2, 2019   (IT) .................. 102019000017687

(51) Int. Cl.
| F23B 60/02 | (2006.01) |
| F23L 1/02 | (2006.01) |
| F23L 9/02 | (2006.01) |

(52) U.S. Cl.
CPC ............... F23B 60/02 (2013.01); F23L 1/02 (2013.01); F23L 9/02 (2013.01); *F23B 2700/037* (2013.01)

(58) Field of Classification Search
CPC ............... F23B 60/02; F23L 1/02; F23L 9/02
See application file for complete search history.

(56) References Cited

U.S. PATENT DOCUMENTS

| 3,499,401 A | * | 3/1970 | Wessberg | ............... F23G 5/32 |
| | | | | 110/317 |
| 4,643,165 A | * | 2/1987 | Chamberlain | .......... F24B 5/026 |
| | | | | 126/77 |

(Continued)

FOREIGN PATENT DOCUMENTS

| CN | 201606921 | 10/2010 |
| CN | 103574590 | 2/2014 |
| EP | 3356495 | 8/2018 |

OTHER PUBLICATIONS

International Search Report filed in PCT/IT2020/050242 mailed Jan. 26, 2021.

*Primary Examiner* — David J Laux
(74) *Attorney, Agent, or Firm* — RANKIN, HILL & CLARK LLP

(57) ABSTRACT

A biomass burner includes a lateral shell having an axis of main development and a bottom provided in a lower end of the lateral shell to delimit the lateral shell at the lower part in order to internally define a compartment to contain the biomass. The bottom is able to support the biomass inside the containing compartment and is provided with one or more first holes configured for the introduction of primary air into the containing compartment.

12 Claims, 4 Drawing Sheets

(56) References Cited

U.S. PATENT DOCUMENTS

| | | | | |
|---|---|---|---|---|
| 5,113,843 A | * | 5/1992 | Henry | F23L 1/02 |
| | | | | 126/77 |
| 5,263,471 A | * | 11/1993 | Shimek | F23L 9/02 |
| | | | | 126/528 |
| 2011/0220090 A1 | * | 9/2011 | Atemboski | F24B 1/006 |
| | | | | 126/500 |
| 2013/0206129 A1 | * | 8/2013 | Brooks | F23B 60/00 |
| | | | | 126/77 |
| 2018/0058724 A1 | | 3/2018 | Haynes et al. | |
| 2018/0080656 A1 | * | 3/2018 | Barry | F24B 1/195 |
| 2018/0237697 A1 | * | 8/2018 | Caregnato | C10B 49/02 |

\* cited by examiner

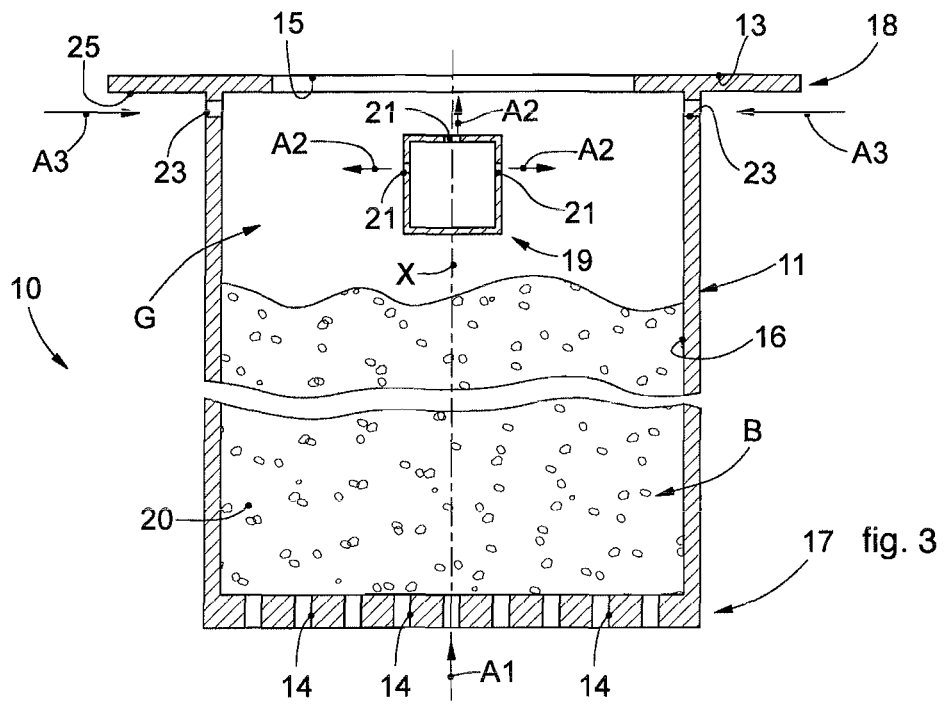
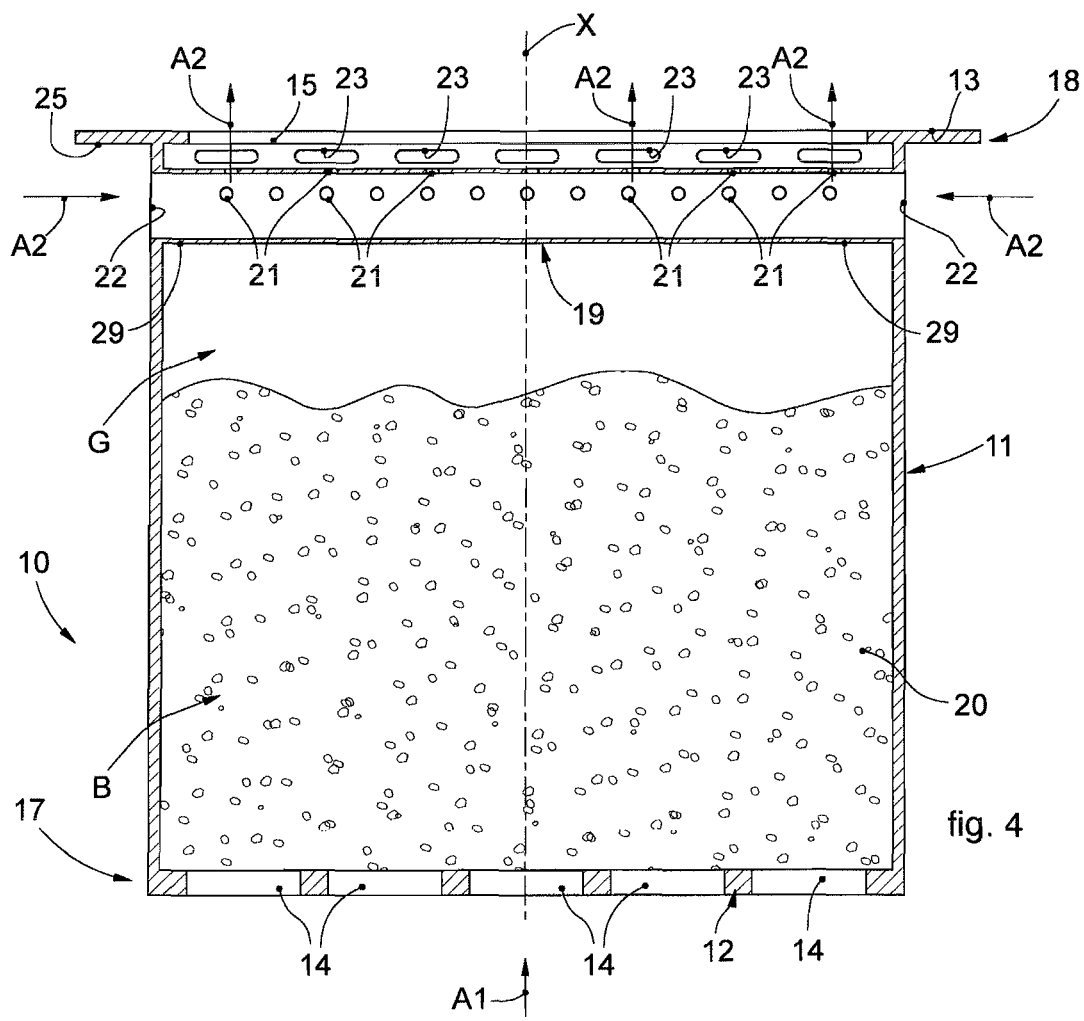

BIOMASS BURNER AND CORRESPONDING BIOMASS COMBUSTION METHOD

FIELD OF THE INVENTION

The present invention concerns a biomass burner and a corresponding biomass combustion method. In particular, the burner in accordance with the present invention can be used for heat generation, for example, for heating domestic or public spaces, for cooking food, or other, or for the production and gasification or storage of biomass charcoal.

The burner can also be used as part of stoves, boilers, fireplaces, or other.

The present invention also concerns, in particular, a method for a better combustion of biomass in a burner.

BACKGROUND OF THE INVENTION

It is known that in a burner for biomass fuel, for example in an incoherent form such as chips, pellets or suchlike, combustion takes place thanks to the presence of the comburent, oxygen, which is usually supplied as primary air and secondary air. The primary air is made to enter a combustion chamber of the burner to fuel the combustion of the biomass once it has been lit. During combustion, combustible gases such as carbon monoxide, hydrogen and methane develop. These combustible gases, in coordination with the introduction of secondary air, complete the combustion of the biomass, generating a flame.

The use of burners in biomass stoves is also known, for example, but not only, pellet stoves.

However, such stoves equipped with known burners have a series of disadvantages such as, for example, low efficiency, poor versatility of use and difficult management of the gasification speed.

Furthermore, stoves equipped with said known burners must comply with increasingly stringent pollution limits in order to reduce the emission of polluting gases and particulates, requiring greater control and management of the combustion and flame generated.

In addition, known burners inserted in said stoves are generally complex and difficult to install and/or uninstall, entailing a high cost of production, management and maintenance.

Document EP-A-3.356.495 in the name of the present Applicant is also known, which describes an apparatus for producing charcoal from biomass. This apparatus comprises a casing, closed at the bottom by a grid or holed plate, and a hollow internal body coaxial to the casing and associated below said grid or holed plate. The biomass is disposed in the casing, on the bottom grid or holed plate, in a gap defined between the casing and the hollow internal body. The primary air enters from below and passes through the grid or holed plate directed toward the biomass, while the secondary air, also coming from below from the same source that supplies the primary air, is channeled into the hollow internal body. The internal body provides, in its upper end opposite the end associated with the grid or holed plate, holes for the exit of the secondary air.

Document US-A-2018/0058724 is also known, which describes a forced air furnace or heater, to heat a space. This document describes a combustion chamber into which primary and secondary combustion air is introduced. The combustion chamber, in particular, has an exit for the combustion products, positioned in correspondence with the upper end of the combustion chamber itself and adjacent to a front end of a secondary combustion air pipe provided with exit holes for the air.

Document CN-A-103574590 describes a known type of biomass burner.

Applicant therefore set himself the purpose of perfecting a burner which can overcome at least one of the disadvantages of the state of the art.

In particular, one purpose of the present invention is to provide a burner which is versatile and, therefore, usable in various applications such as, for example, but not only, the production of charcoal from biomass and/or in heat generation.

Another purpose of the present invention is to provide a compact burner which can be applied to already existing products such as stoves, boilers, cooking devices or suchlike.

Another purpose of the present invention is to provide a burner which is easy to install, maintain and clean.

Another purpose is to produce a burner which, when installed in a stove, in particular a biomass stove, for example of the pellet type, allows to optimize the combustion of the fuel in the stove through an efficient management thereof with a consequent reduction of the correlated emissions.

Another purpose of the present invention is to perfect a biomass combustion method that allows an efficient, controlled and correct combustion of the biomass.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a biomass burner in accordance with the present invention comprises:
  a lateral shell having an axis of main development,
  a bottom provided in a lower end of the lateral shell to delimit the lateral shell at the lower part in order to internally define a compartment to contain the biomass, the bottom being able to support the biomass inside the containing compartment and being provided with one or more first holes configured for the introduction of primary air into the containing compartment, the lateral shell comprising an upper end edge opposite the lower end, which delimits an aperture for generating the combustion flame, diametrically opposite the bottom along the axis of main development,
  at least one introduction pipe configured to receive secondary air to be supplied for the combustion of gases generated by the biomass, the introduction pipe being provided with one or more second holes for delivering the secondary air.

According to one aspect of the invention, the introduction pipe is disposed inside the containing compartment in correspondence with the upper end edge of the lateral shell, substantially at the height of the aperture and inside the perimeter of the upper end edge delimiting the aperture, the introduction pipe extending transversely to the axis of main development of the lateral shell so that the one or more second holes substantially affect at least part of the transverse extension of the aperture.

Advantageously, the disposition of the at least one introduction pipe in the upper end edge of the shell allows to simplify the construction of the burner, also considerably facilitating its cleaning and maintenance operations since the introduction pipe is functionally and constructively separated from the bottom on which, during use, the biomass is disposed.

This burner is therefore more simplified than known burners, while ensuring high efficiency making it suitable to be applied both on its own and also in cooperation with already existing products such as stoves, boilers, cooking devices, biomass charcoal production devices or other.

Advantageously, moreover, the disposition of the at least one introduction pipe in the upper end edge of the shell, substantially diametrically opposite the bottom, also allows to separate the feed of the flow of primary air through the bottom from the flow of secondary air through the introduction pipe, promoting a possible functional and possibly spatial modularity of the burner. In this way, the combustion inside the burner is more controllable and, therefore, more efficient, making the most of the biomass fuel and reducing energy losses to a minimum.

The present invention also concerns a method for the combustion of biomass in a burner as described above.

According to the invention, the method comprises:

positioning the biomass in a lower housing zone inside the containing compartment and delimited by the bottom;

feeding primary air through first holes provided in the bottom of the containing compartment and toward the biomass in a direction substantially parallel to the axis of main development of the lateral shell;

burning the top of the biomass so that it combines with the primary air to produce combustible gas in the lower housing zone inside the containing compartment;

feeding secondary air into the upper flame generation zone transversely to the axis of main development along the at least one introduction pipe inside which it is preheated;

uniformly distributing the secondary air, through the second holes, in the upper flame generation zone, the secondary air combining in the upper flame generation zone with the combustible gas producing a flame in correspondence with the aperture.

Advantageously, this combustion method allows to obtain a more precise, controlled and targeted distribution of the secondary air in the upper flame generation zone, so as to suitably make the flame produced converge toward the aperture and reduce the formation of non-combusted products that can be generated by the combustion of the biomass.

ILLUSTRATION OF THE DRAWINGS

These and other aspects, characteristics and advantages of the present invention will become apparent from the following description of some embodiments, given as a non-restrictive example with reference to the attached drawings wherein:

FIG. 3 is a lateral view along section line III-III of FIG. 2;

FIG. 4 is a lateral view along section line VI-VI of FIG. 2;

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

Figure 1:
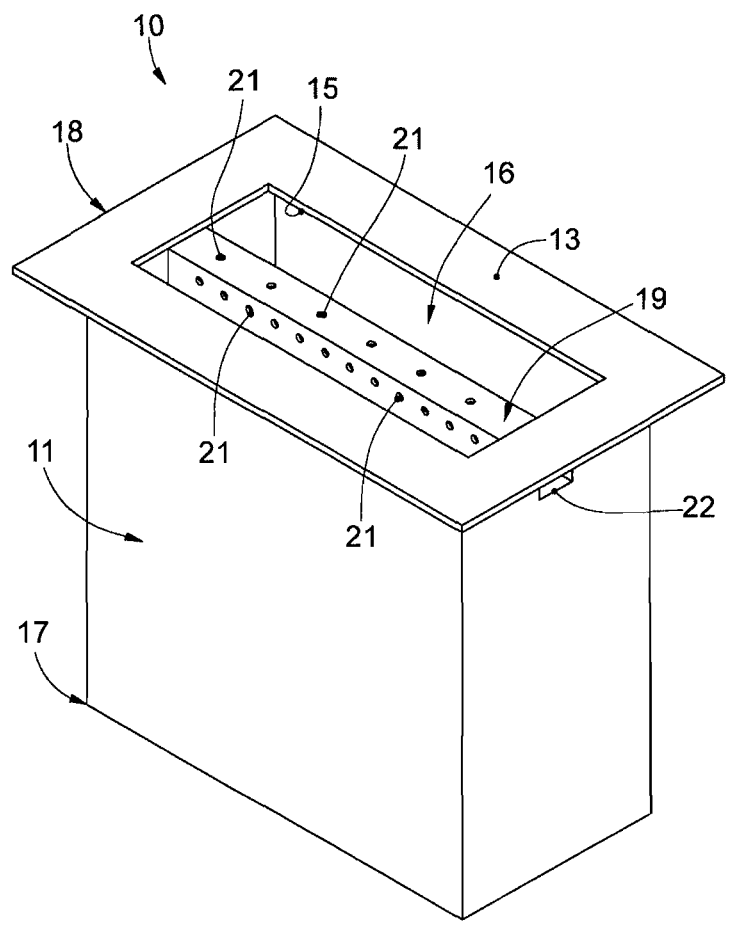
FIG. 1 is a three-dimensional view of a biomass burner according to one embodiment of the present invention.

We will now refer in detail to the possible embodiments of the invention, of which one or more examples are shown in the attached drawings. Each example is supplied by way of illustration of the invention and shall not be understood as a limitation thereof. For example, one or more of the characteristics shown or described insomuch as they are part of one embodiment can be adopted on, or in association with, other embodiments to produce other embodiments. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

With reference to the attached drawings, embodiments of a burner 10 configured for combustion, for example, of biomass 20, or other type of fuel, are described. By combustion here and hereafter in the description we mean a chemical-physical reaction that involves the oxidation of a fuel, in this specific case biomass, by an oxidizing agent, that is, oxygen contained in the air, with the development of heat and the production of a high temperature flame and gas.

It is not excluded that the burner 10 in accordance with the present invention may be used in apparatuses for the pyrolysis of biomass and, therefore, for producing charcoal from biomass, so-called "biochar".

Furthermore, the burner 10 can be used for the combustion of other incoherent solid fuels, for example, but not limited to, charcoal.

The burner 10 can be used on its own or it can be integrated or associated with a stove, a boiler, a hob or other device or apparatus for generating heat, in particular for heating or cooking.

The burner 10 comprises a lateral shell 11 having an axis of main development X.

The lateral shell 11 can be made of metal material, or similar material resistant to high temperatures.

The lateral shell 11 can have, for example, a rectangular shape (FIG. 1), or prismatic, cylindrical (FIG. 6), or oval, or semicircular, or similar, or comparable or even other shapes.

With reference to FIGS. 1-8, the burner 10 comprises a bottom 12 provided in a lower end 17 of the lateral shell 11 to delimit the lateral shell 11 at the lower part in order to define, inside the latter, a compartment 16 for containing the biomass 20.

The lateral shell 11 comprises an upper end edge 18 opposite the lower end 17. The upper end edge 18 defines an aperture 15 for generating the combustion flame F. For example, the upper end edge 18 is a window, for example of quadrangular shape, in particular rectangular, which delimits the aperture 15 as above.

In particular, the aperture 15 is opposite the bottom 12 along the axis of main development X.

The upper end edge 18 of the shell 11 can have a flange 13 so as to facilitate the installation of the burner 10.

In particular, the flange 13 can comprise the aperture 15.

The bottom 12 is able to support the biomass 20 inside the containing compartment 16.

Figure 2:
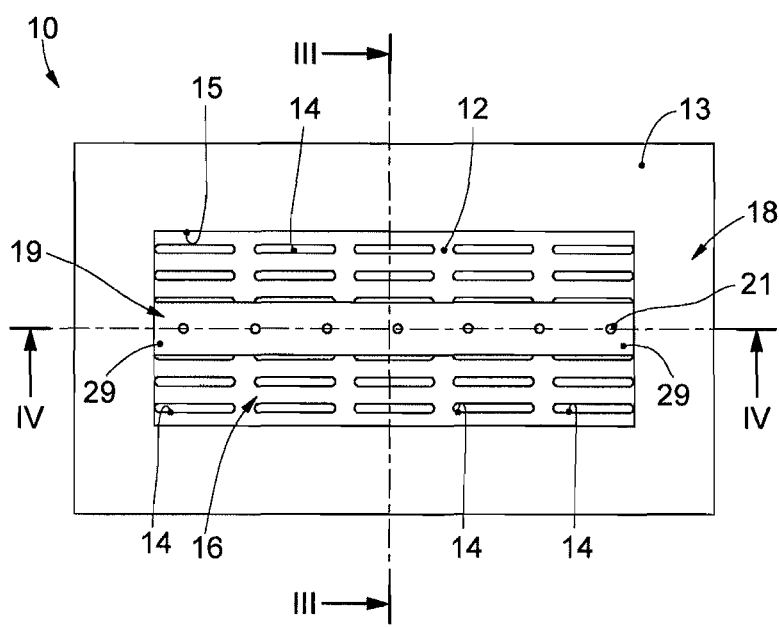
FIG. 2 is a top view of the burner of FIG. 1.
Figure 7:
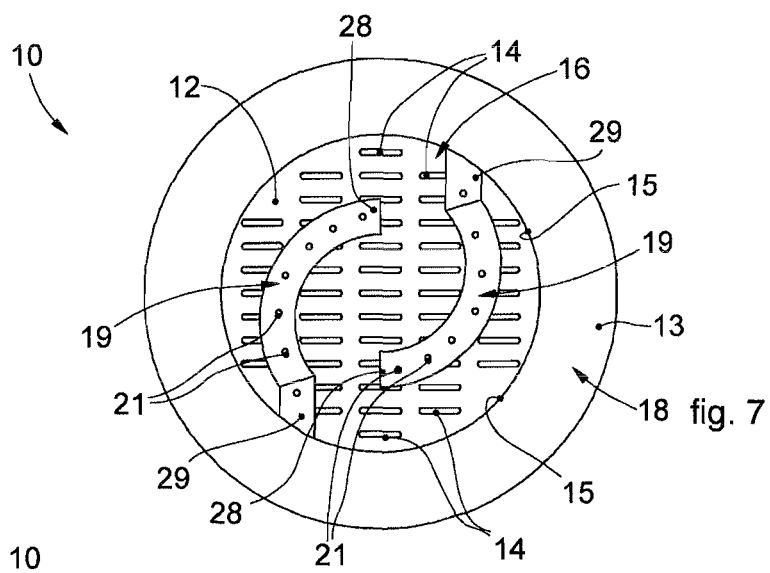
FIG. 7 is a top view of the burner of FIG. 6.

In particular, with reference to the embodiments described using FIGS. 2 and 7, the bottom 12 is provided with one or more first holes 14 configured for the introduction of primary air A1 into the containing compartment 16.

For example, the bottom 12 can be a perforated plate with holes of sizes suitable to retain the biomass 20 and allow the passage of air, or a grid or a net of metal material, or material suitable to withstand high temperatures, the weft of which has meshes of sizes suitable to prevent the biomass 20 from falling and, at the same time, allow the passage of air, in particular primary air A1, through the bottom 12 toward the inside of the containing compartment 16.

In particular, the primary air A1 feeds the partial combustion of the biomass 20 generating combustible gas that tends to exit through the aperture 15.

For example, the first holes 14 can be eyelet-shaped, or circular or rectangular or other similar or comparable shapes suitable to prevent the passage of the biomass 20 through them.

Figure 5:
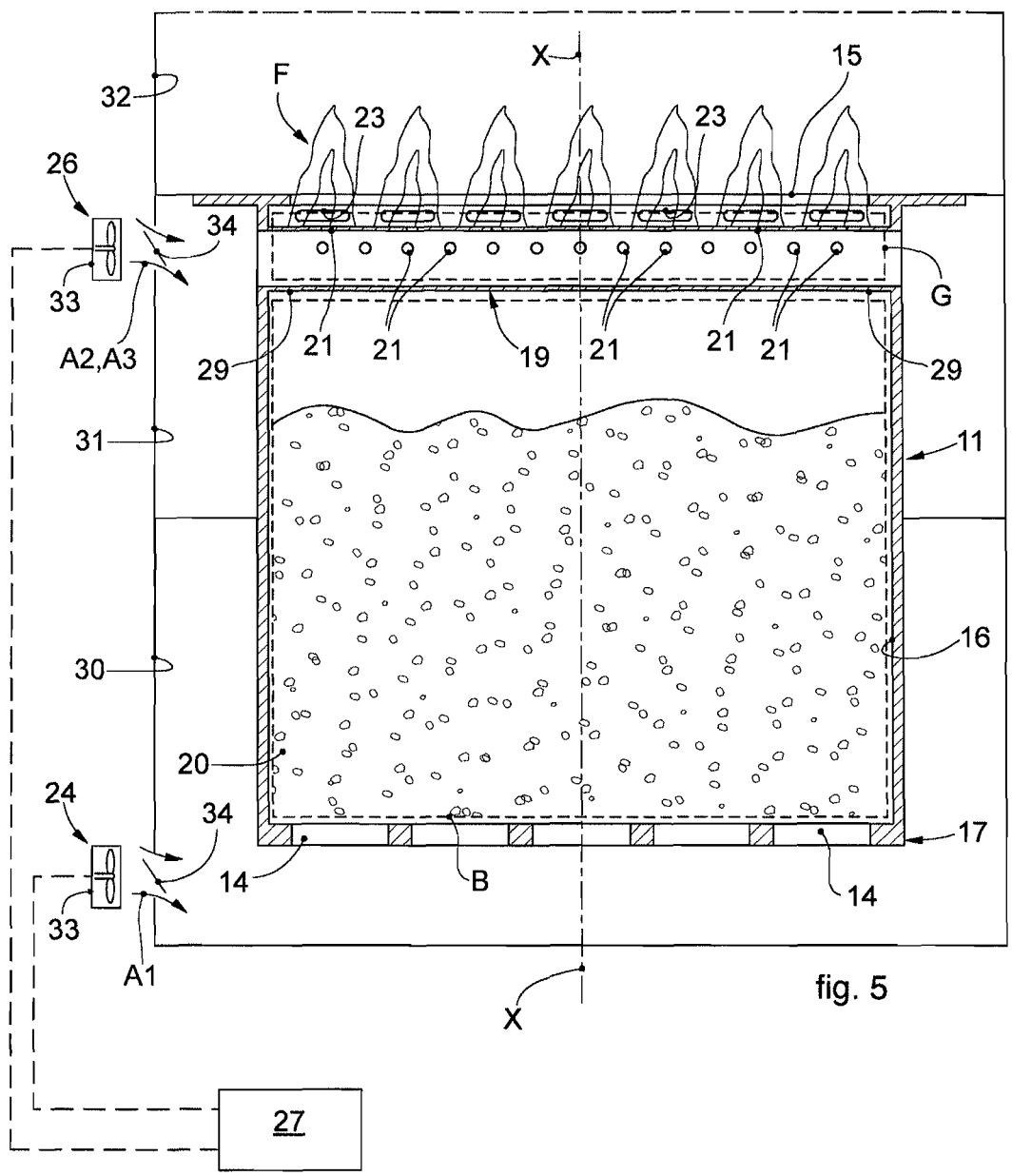
FIG. 5 is a schematic section view of one variant of the biomass burner of FIG. 1.

According to one embodiment shown by way of example in FIG. 5, the burner 10 comprises means 24 for feeding primary air A1 associated with the lower end 17 of the lateral shell 11 and configured to supply primary air A1 through the one or more first holes 14 of the bottom 12.

The feed means 24 can send primary air A1 either by natural and/or forced circulation in the quantity expressly desired. The functioning of the means 24 for feeding air can also be variable during the functioning cycle.

For example, with reference to FIG. 5, the means 24 for feeding primary air A1 can comprise one or more ventilation devices 33 or similar means for moving the air.

The bottom 12 can be made in a single body with the lateral shell 11.

The bottom 12 can be integrally associated with the lateral shell 11, for example by means of welding or mechanical attachment means such as, for example but not limited to, screws, pins or supports.

According to one embodiment, the bottom 12 can be connected in a selectively releasable manner with respect to the lateral shell 11. This solution allows to open the bottom of the containing compartment 16 and is particularly advantageous, possibly, for the recovery of the charcoal produced, if the burner 10 provides this application, or for the removal of ash and combustion residues. In this way, the burner 10 can be easily cleaned, requiring lower maintenance and cleaning costs.

In particular, the bottom 12 can be configured to open in the manner of a trap door or a guillotine, or by rotating with respect to an axis perpendicular with respect to the axis of main development X in order to facilitate the recovery of the charcoal, the removal of the ash and/or the cleaning of the containing compartment 16. With reference to the attached drawings, in some embodiments the burner 10 comprises at least one introduction pipe 19 disposed inside the containing compartment 16 and configured to receive secondary air A2 to be supplied for the combustion of the combustible gases generated by the biomass 20.

In particular, in some embodiments the at least one introduction pipe 19 is provided with one or more second holes 21 for delivering the secondary air A2.

According to one embodiment, the introduction pipe 19 is disposed in correspondence with the upper end edge 18 of the lateral shell 11, substantially at the height of the aperture 15 and inside the perimeter of the upper end edge 18 delimiting said aperture 15. With the expression "substantially at the height" we mean that the introduction pipe 19 is at around the same height of the aperture 15 along the axis of main development X, meaning that it can also be slightly below this aperture 15, as can be seen for example in FIGS. 1, 3, 4, 5, 6, 8 attached hereto. In particular, in some embodiments the introduction pipe 19 is disposed inside the containing compartment 16, delimited by the lateral shell 11, slightly upstream, that is, slightly below, with respect to the aperture 15 along the axis of main development X.

According to one embodiment, the introduction pipe 19 extends transversely to the axis of main development of the lateral shell 11 so that one or more second holes 21 substantially affect at least part of the transverse extension of the aperture 15.

In particular, the at least one introduction pipe 19 is able to feed secondary air A2 into the upper part of the containing compartment 16 which combines with the combustible gas produced inside it in order to generate a combustion flame F.

Advantageously, the disposition of the at least one introduction pipe 19 in the upper end edge 18 of the lateral shell 11 does not interfere with the volume that can be occupied by the biomass 20 inside the containing compartment 16, guaranteeing an easier feed of the biomass and an easier evacuation of the solid products of the combustion.

This evacuation can be carried out, for example, through the possibly removable bottom 12.

By solid products of the combustion we mean both ash and also charcoal obtained from biomass gasification.

Furthermore, the disposition of the at least one introduction pipe 19 in the upper end edge 18 of the lateral shell 11 allows to simplify the operations of construction, production and maintenance of the burner 10, producing a burner 10 that is efficient and economically affordable.

According to one embodiment shown by way of example in FIG. 5, the burner 10 can also comprise secondary feed means 26 configured to supply secondary air A2 to the at least one introduction pipe 19.

The secondary feed means 26 can be associated with the upper end edge 18 of the lateral shell 11.

These secondary feed means 26 can function in natural ventilation or they can comprise ventilation devices, compressors, fans or similar means for moving the air.

For example, but not only, with reference to FIG. 5, the secondary feed means 26 can comprise at least one ventilation device 33 or similar means for moving the air.

According to one embodiment, the means 24 for feeding primary air A1 and the secondary means 26 for feeding secondary air A2 are configured to function independently from each other. In this way, it is possible to manage the sending of primary air A1 and secondary air A2 separately and independently.

In particular, with reference to FIG. 5, the burner 10 can be associated with at least two compartments 30, 31 for distributing air, independent of each other, of which:
 a first compartment 30 for distributing primary air A1 which contains the lower end of the lateral shell 11 and the bottom 12;

a second compartment 31 for distributing secondary air A2 which contains the upper end of the lateral shell 11, opposite the lower end as above.

The first distribution compartment 30 can be associated with the means 24 for feeding primary air A1 in order to selectively send primary air A1 to the first holes 14 of the bottom 12.

The second distribution compartment 31 can be associated with the secondary feed means 26 in order to selectively send secondary air A2 to the second holes 21.

In particular, the first distribution compartment 30 and the second distribution compartment 31 are separate and autonomous from each other.

The means 24 for feeding primary air A1 and the secondary means 26 for feeding secondary air A2 can respectively comprise delivery valves 34 or shutters for selectively introducing primary air A1 into said first distribution compartment 30 and secondary air A2 into said second distribution compartment 31.

With reference to FIG. 5, these valves 34 can be associated with the respective ventilation devices 33.

According to one embodiment shown by way of example in FIG. 5, the burner 10 is associated with a combustion chamber 32 which develops above the second distribution compartment 31, separately from the latter.

In particular, the combustion chamber 32 is in communication with the aperture 15 in order to allow the correct and safe development of the flame inside the combustion chamber 32.

According to one embodiment, the at least one introduction pipe 19 develops on a lying plane parallel to the bottom 12 in the upper end edge 18 of the lateral shell 11.

According to one embodiment, the introduction pipe 19 can have a rectangular, prismatic, circular or ovoid cross-section, as a function of the shape and size of the lateral shell 11.

Figure 6:
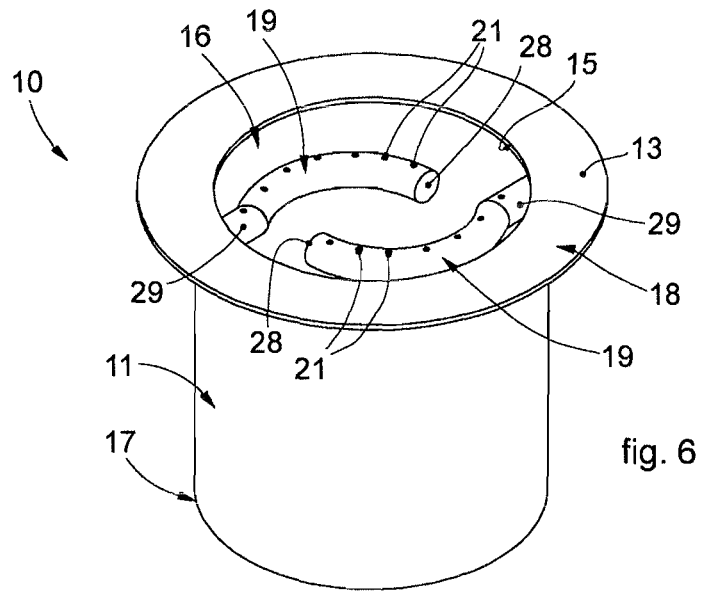
FIG. 6 is a three-dimensional view of a biomass burner in accordance with another embodiment of the present invention.

According to one embodiment shown by way of example in FIG. 6, the at least one introduction pipe 19 is disposed protruding cantilevered from the lateral shell 11 toward the inside of the containing compartment 16, having one end 28 free, that is, unconstrained, and one end 29 connected to the lateral shell 11, wherein at least one aperture 22 for introducing secondary air A2 is present in correspondence with the connected end 29.

According to one embodiment shown by way of example in FIG. 1, the introduction pipe 19 is attached transversely to the lateral shell 11 connecting from side to side the upper end edge 18 in correspondence with respective connected ends 29 and has corresponding apertures 22 for introducing secondary air A2, terminal and opposite in correspondence with the respective connected ends 29.

These introduction apertures 22 can be defined passing through the lateral shell 11.

The introduction pipe 19 is integrally connected to the lateral shell 11. In this way, during the step of installing or uninstalling a small burner 10, for example but not limited to, in the case of extraction from a stove, the operator can grip the introduction pipe 19 using it as a gripping element for introducing/extracting the burner 10 into/from the location of use inside the stove.

The introduction pipe 19 can be made in a single body with the lateral shell 11.

The introduction pipe 19 can be entirely welded to the lateral shell 11.

According to one possible embodiment, the at least one introduction pipe 19 can be selectively removed from the burner 10.

According to one embodiment, the introduction pipe 19 is perpendicular to the axis of main development X of the lateral shell 11.

According to one embodiment, the containing compartment 16 provides a lower zone B for housing the biomass 20 delimited by the bottom 12 and an upper flame generation zone G in correspondence with the aperture 15, which during use is not affected by the presence of biomass 20.

According to one embodiment, the second holes 21 of the at least one introduction pipe 19 are completely disposed in the upper flame generation zone G.

Advantageously, the introduction pipe 19 is excluded from the lower housing zone B because the biomass 20 must not interfere with the introduction of secondary air A2 and, therefore, must not obstruct the second holes 21 of the introduction pipe 19, in order to guarantee a correct combustion. Consequently, the lower housing zone B substantially corresponds to a maximum volume that can be occupied by the biomass 20 inside the containing compartment 16 in order to guarantee the correct combustion thereof.

According to one embodiment, the one or more second holes 21 are uniformly distributed along the introduction pipe 19 in a manner mating with the development of the upper flame generation zone G. During use, the combustible gases produced by the partial combustion of the biomass are concentrated in the upper flame generation zone G, a uniform and desired distribution of the second holes 21 in this flame generation zone G allows a correct mixing between secondary air A2 and combustible gas, the mixing being necessary to correctly complete the combustion.

According to one embodiment, the second holes 21 are therefore disposed in such a way as to allow a desired distribution of the secondary air A2 and to suitably convey the generated flame F through the aperture 15 so as to suitably manage the flame F itself, optimizing the combustion and reducing energy losses.

According to one embodiment, the introduction pipe 19 comprises a plurality of second holes 21 disposed with an essentially longitudinal development, facing toward the upper end edge 18 and/or at the upper part toward the outside with respect to the aperture 15.

According to one embodiment, the introduction pipe 19 can provide at least one sequence of second holes 21 disposed aligned in a row along the pipe, perpendicularly to the axis of main development X of the lateral shell 11.

In particular, the distance between one second hole 21 and the following one, as well as the distribution of the second holes 21, is mating and coordinated with the intensity of the flame F to be obtained and the type of application of the burner 10.

According to one possible embodiment, the introduction pipe 19 provides at least one sequence of second holes 21 disposed in a zig-zag or offset manner along the introduction pipe 19, perpendicularly to the axis of main development X of the lateral shell 11.

According to one embodiment, the second holes 21 can be disposed on parallel rows, perpendicular to the axis of main development X, along the introduction pipe 19.

With reference to FIGS. 1-5, the introduction pipe 19 provides:
- a first plurality of second holes 21 disposed on a first side of the introduction pipe 19 and facing toward the internal wall of the containing compartment 16 in the upper end edge 18;
- a second plurality of second holes 21 disposed on a second side of the introduction pipe 19, opposite the first side, and facing toward the internal wall of the containing compartment 16 in the upper end edge 18;

a third plurality of second holes 21 disposed on a third side of the introduction pipe 19 and facing toward the aperture 15.

According to one embodiment, the at least one introduction pipe 19 does not provide second holes 21 in correspondence with the connection with the lateral shell 11, so as to better direct the flame F making it converge toward the center of the aperture 15 and preventing compromising the internal walls of the containing compartment 16 in correspondence with the upper end edge 18 of the lateral shell 11.

According to one embodiment, the burner 10 can provide one or more introduction pipes 19 according to the size and shape of the lateral shell 11, preferably according to the size and geometric shape of the aperture 15.

According to one embodiment, the burner 10 provides one or more pipes 19 for introducing secondary air A2 having a geometric shape and a spatial disposition in correspondence with the upper end edge 18 mating at least with the geometric shape of the aperture 15. In this way, a more uniform and targeted distribution of the secondary air A2 in the upper flame generation zone G is obtained, so as to better manage the flame F produced.

For example, in the embodiment shown by way of example in FIG. 1, the burner 10 provides a rectangular introduction pipe 19 mating with the rectangular shape of the lateral shell 11 and the rectangular shape of the aperture 15.

Again, in the embodiment shown by way of example in FIG. 6, the burner 10 provides two introduction pipes 19 having a semicircular development, opposite each other, along the lying plane parallel to the bottom 12. This development is mating with the cylindrical shape of the lateral shell 11 and the circular shape of the aperture 15.

Advantageously, the position and conformation of the at least one introduction pipe 19 in the upper flame generation zone G in the upper end edge 18 contribute to define the shape and intensity of the flame generated in cooperation with the shape and conformation of the aperture 15.

For example, the flange 13 and/or the upper end edge 18 can provide a shelf 25 projecting toward the inside of the containing compartment 16 configured to reduce the aperture 15 with respect to the cross-section of the lateral shell 11, in order to better channel the combustible gas obtained toward the aperture 15.

According to embodiments shown by way of example in FIGS. 3-5 and 8, the burner 10 can comprise a plurality of elements 23 for the entry of tertiary air A3 associated with the upper end edge 18 of the lateral shell 11 in correspondence with the aperture 15.

According to one embodiment, the entry elements 23 are provided in the upper flame generation zone G.

The tertiary air A3 can be used for better flame management F, reducing the emission of non-combusted products.

According to one embodiment, the entry elements 23 are configured to cooperate with the at least one pipe 19 for introducing secondary air A2.

These elements 23 for the entry of tertiary air A3 can be, for example but not limited to, through holes in the lateral shell 11.

According to one embodiment, the entry elements 23 have a distribution along the lateral shell 11 mating with the shape of the at least one pipe 19 for introducing secondary air A2 and of the aperture 15.

For example, in the embodiment shown by way of example in FIGS. 3-5, the entry elements 23 are disposed on two opposite sides of the lateral shell 11 on rows parallel to the introduction pipe 19 and facing each other.

Figure 8:
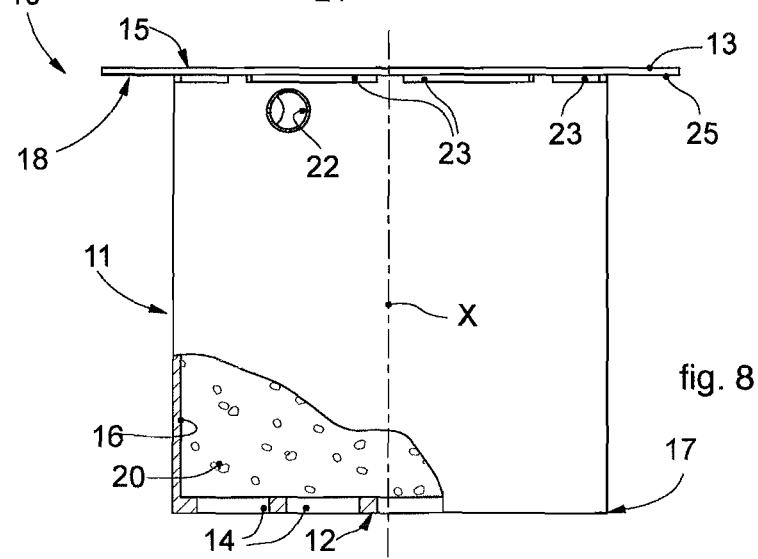
FIG. 8 is a lateral view of the burner of FIG. 6.

For example, in the embodiment shown by way of example in FIG. 8, the entry elements 23 are disposed circumferentially on the lateral shell 11 following the circular development of the aperture 15 and of the two introduction pipes 19.

According to one possible embodiment, the secondary feed means 26 can also feed tertiary air A3 through the entry elements 23.

In particular, the secondary feed means 26 associated with the second distribution compartment 31 are configured to supply both secondary air A2 toward the at least one introduction pipe 19 and also tertiary air A3 through the entry elements 23.

According to one embodiment, the burner 10 can comprise a control unit 27 which, as a function of the combustion parameters detected, for example by suitable sensors, regulates the feed of the primary air A1, the secondary air A2 and, if present, the tertiary air A3. By combustion parameters we mean, for example but not limited to, the temperature of the gases produced and/or the composition thereof.

In particular, in the event of a malfunction or the need to interrupt the combustion, the control unit 27 can command the selective automatic opening of the bottom 12 in order to release the contents, interrupting the combustion.

According to one embodiment, the control unit 27 is able to control and regulate the means 24 for feeding primary air A1 and the secondary means 26 for feeding secondary air A2 and, if present, tertiary air A3. In this way, it is possible to manage the combustion dynamically.

According to one embodiment, a method for the combustion of biomass 20 in the burner 10 comprises:

positioning the biomass 20 in the lower housing zone B in the containing compartment 16;

feeding the primary air A1 through first holes 14 provided in the bottom 12 of the containing compartment 16 and toward the biomass 20 in a direction substantially parallel to the axis of main development X of the lateral shell 11;

burning the top of the biomass 20 so that it combines with the primary air A1 to produce combustible gas in the lower housing zone B;

feeding the secondary air A2 into the upper flame generation zone G transversely to the axis of main development X along the at least one introduction pipe 19 inside which it is preheated;

uniformly distributing the secondary air A2, through the second holes 21, in the upper flame generation zone G in which the secondary air A2 combines with the combustible gas producing a flame F in correspondence with the aperture 15.

In particular, the secondary air A2 is distributed to suitably shape the flame F as above.

Favorably, the secondary air A2 is fed by the introduction pipe 19, into the containing compartment 16, slightly upstream, that is, slightly below, with respect to the aperture 15 along the axis of main development X. Advantageously, this secondary air A2 is then introduced immediately below the flame generation zone, the flame being ignited thanks to this secondary air A2.

Advantageously, since the introduction pipe 19 is in the upper flame generation zone G, it can be preheated by conduction and convection with the hot gases present in this flame generation zone G so as to transmit the heat by conduction to the secondary air A2 which passes inside it.

Furthermore, since the introduction pipe 19 is substantially transverse to the aperture 15, it is uniformly lapped by the hot gases as above, heating up in a uniform manner.

According to one embodiment, the secondary air A2 can be distributed in the upper flame generation zone G in a direction substantially the same as the direction of delivery of the primary air A1.

According to one embodiment, the secondary air A2 can be distributed in the upper flame generation zone G toward the aperture 15 and/or toward the internal walls of the containing compartment 16.

According to one embodiment, the secondary air A2 can be distributed in the upper flame generation zone G in a direction at least partly inclined with respect to the direction of delivery of the primary air A1.

According to one embodiment, the method also provides to send tertiary air A3 into the upper flame generation zone G inside the containing compartment 16, so as to cooperate with the secondary air A2.

According to one embodiment, the secondary air A2 can be distributed in the upper flame generation zone G in a direction at least partly inclined or perpendicular with respect to the direction of delivery of the primary air A1 and opposite or counter-current to the direction of delivery of the tertiary air. A3, so as to better direct the flame F in order to make it converge toward the aperture 15. This solution allows to improve the turbulence in the flame F itself and to improve the mixing of the combustible gas and the secondary air A2.

It is clear that modifications and/or additions of parts or steps may be made to the biomass 20 burner 10 and to the method for the combustion of biomass 20 as described heretofore, without departing from the field and scope of the present invention.

It is also clear that, although the present invention has been described with reference to some specific examples, a person of skill in the art shall certainly be able to achieve many other equivalent forms of burner 10 and method for the combustion of biomass 20, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A biomass burner comprising:
   a lateral shell having an axis of main development,
   a bottom provided in a lower end of said lateral shell to delimit said lateral shell at the lower part in order to internally define a compartment to contain the biomass, said bottom being able to support the biomass inside said containing compartment and being provided with one or more first holes configured for the introduction of primary air into said containing compartment,
   said lateral shell comprising an upper end edge opposite said lower end, which delimits an aperture for generating the combustion flame, diametrically opposite said bottom along said axis of main development,
   at least one introduction pipe configured to receive secondary air to be supplied for the combustion of gases generated by the biomass, said introduction pipe being provided with one or more second holes for delivering the secondary air, wherein said introduction pipe is disposed inside said containing compartment in correspondence with said upper end edge of the lateral shell, substantially at the height of said aperture and inside the perimeter of the upper end edge delimiting said aperture, said introduction pipe extending transversely to the axis of main development of said lateral shell so that said one or more second holes substantially affect at least part of the transverse extension of said aperture and; a plurality of
   elements for the entry of tertiary air associated with the upper end edge of the lateral shell in correspondence with said aperture, said entry elements being configured to cooperate with said at least one pipe for introducing secondary air and having a distribution along the lateral shell mating with the shape of said at least one pipe for introducing secondary air and of the aperture.

2. The burner as in claim 1, wherein said containing compartment provides a lower zone for housing the biomass delimited by said bottom, and an upper flame generation zone for generating the flame in correspondence with said aperture, which during use is not affected by the presence of biomass, wherein said at least one introduction pipe is completely disposed in said upper flame generation zone.

3. The burner as in claim 2, wherein said one or more second holes are uniformly distributed along the introduction pipe in a manner mating with the development of the upper flame generation zone.

4. The burner as in claim 1, wherein said introduction pipe comprises a plurality of second holes disposed with an essentially longitudinal development, facing toward said upper end edge and/or at the upper part toward the outside with respect to said aperture.

5. The burner as in claim 1, wherein said at least one introduction pipe is disposed protruding cantilevered from said lateral shell toward the inside of said containing compartment, having one end unconstrained and ene a connected end connected to said lateral shell, there being present at least one aperture for introducing secondary air in correspondence with said connected end.

6. The burner as in claim 1, wherein said at least one introduction pipe is attached transversely to said lateral shell connecting from side to side said upper end edge in correspondence with respective connected ends, and has corresponding apertures for introducing secondary air, terminal and opposite in correspondence with said respective connected ends.

7. The burner as in claim 1, further comprising one or more pipes for introducing secondary air having a geometric shape and a spatial disposition in correspondence with said upper end edge mating at least with the geometric shape of said aperture.

8. The burner as in claim 1, further comprising:
   a first compartment for distributing primary air which contains the lower end of the lateral shell and the bottom, said first distribution compartment being associated with feed means for feeding primary air configured to supply primary air through said one or more first holes of the bottom;
   a second compartment for distributing secondary air which contains the upper end of the lateral shell opposite said lower end, said second distribution compartment being associated with secondary feed means configured to supply secondary air to said at least one introduction pipe;
   said first distribution compartment and second distribution compartment being separate and autonomous from each other;
   said feed means and said secondary feed means being configured to function independently from each other, a control unit-being provided able to control and regulate said feed means and said secondary feed means.

9. The burner as in claim 1, wherein said secondary feed means are configured to supply both secondary air toward the at least one introduction pipe and also tertiary air through said entry elements.

10. The burner as in claim 1, wherein said introduction pipe is disposed, inside the containing compartment, slightly upstream of the aperture along the axis of main development.

11. A method for the combustion of biomass in a burner according to claim 1, said method comprising:
  positioning said biomass in a lower housing zone inside said containing compartment and delimited by said bottom;
  feeding primary air through first holes provided in the bottom of the containing compartment and toward the biomass in a direction substantially parallel to the axis of main development of the lateral shell;
  burning the top of the biomass so that the biomass combines with said primary air to produce combustible gas in the lower housing zone inside said containing compartment;
  feeding secondary air into an upper flame generation zone transversely to the axis of main development along said at least one introduction pipe inside which the secondary air is preheated;
  uniformly distributing said secondary air, through the second holes, in said upper flame generation zone, said secondary air combining in said upper flame generation zone with said combustible gas producing a flame in correspondence with the aperture and; sending
  tertiary air into said flame generation zone inside the containing compartment so as to cooperate with said secondary air.

12. The method as in claim 11, wherein said secondary air is fed by said introduction pipe, into the containing compartment, slightly upstream of the aperture along the axis of main development.

* * * * *